May 18, 1943.                B. W. JONES                2,319,688
                             ENGINE STARTER
                           Filed July 9, 1941

INVENTOR.
BY  Burr W. Jones
    Clinton S. James
                ATTY.

Patented May 18, 1943

2,319,688

UNITED STATES PATENT OFFICE 2,319,688

ENGINE STARTER

Burr W. Jones, Elmira Heights, N. Y., assignor to Bendix Aviation Corporation, South Bend, Ind., a corporation of Delaware Application July 9, 1941, Serial No. 401,609

2 Claims. (Cl. 74—7)

The present invention relates to engine starters and more particularly to drive gearing for automatically connecting a starting motor to an engine gear when the starting motor is energized, and automatically disconnecting the starting motor when the engine starts.

It is an object of the present invention to provide an engine starter drive which is efficient and reliable in operation, simple in construction, small in size and economical to manufacture.

It is another object to provide such a device incorporating an annular block of elastically deformable material interposed between the pinion and its traversing means, with means for placing the block under compression during cranking.

It is a further object to provide such a device in which the parts are so telescoped that the over-all length of the drive is exceptionally short, while the diameter is also made very small without unduly weakening the parts.

Further objects and advantages will be apparent from the following description taken in connection with the accompanying drawing, in which.

Figure 1:
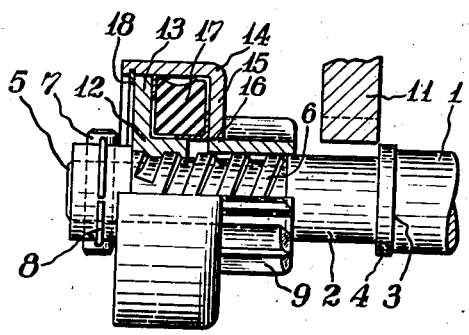
Fig. 1 is a side elevation partly broken away and in axial section of a preferred embodiment of the invention.

In Fig. 1 of the drawing there is illustrated a power shaft 1 having a smooth reduced extension 2 forming a shoulder 3 against which a hardened washer 4 is seated. Shaft 1 is provided with a further reduced smooth cylindrical extension 5 on which a screw shaft 6 is mounted and rigidly fixed by suitable means such as a cross pin 7 retained by a split lock ring 8. The external diameter of the screw shaft 6 is the same as that of the extension 2 of shaft 1, and a pinion member 9 is slidably journaled on the screw shaft and the extension 2 for longitudinal movement into and out of engagement with a member such as a gear 11 of an engine to be started, the operative position of the pinion being defined by its engagement with the thrust ring 4.

Means for actuating the pinion from the screw shaft is provided in the form of a nut member 12 on the screw shaft 6 having a radial flange 13, and a barrel member 14 having a radial flange 15 anchored in any suitable manner to the pinion 9 as indicated at 16. A cylindrical block 17 of elastically deformable material such as rubber is mounted on the nut member 12 within the barrel 14 and maintained in light frictional engagement with the flange 15 of the barrel and the flange 13 of the nut member by means of a split lock ring 18 in the open end of the barrel adapted to engage the flange 13 of the nut member.

In operation, rotation of the power shaft 1 is transmitted through the pin 7 to the screw shaft 6 whereby the nut 12 is caused to traverse the pinion 9 into engagement with the engine gear 11, and thereafter to transmit rotation thereto through the yielding connection formed by the rubber block 17. When the engine starts, the pinion 9 is caused to overrun the drive, whereupon the nut member 12 is moved back to idle position, bringing with it the rubber block, the barrel 14 and the pinion. It will be noted that inasmuch as the only connection between the nut and pinion is through the block 17, and the compression is largely relieved when the parts are in idle position, rebounding of the pinion toward driving position is damped out by the overrunning of this connection with the slight friction caused by the initial compression of the rubber block.

Figure 3:
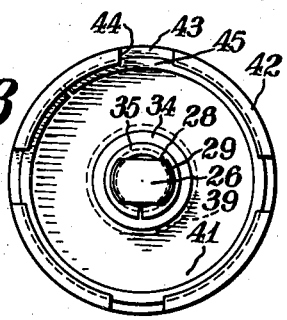
Fig. 3 is an end view from the left of Fig. 2.
Figure 2:
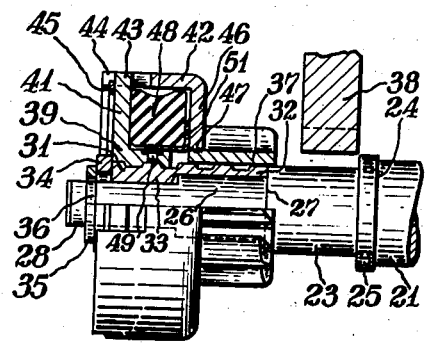
Fig. 2 is a similar view of a modified form of the invention.

In the embodiment of the invention illustrated in Figs. 2 and 3, a drive shaft 21 has a first smooth reduced extension 23 defining a shoulder 24 against which a hardened thrust ring 25 is seated. Shaft 21 has a further smooth reduced section 26 forming a shoulder 27, and diametrically opposite flats 28 are formed on the terminal portion of the latter extension so as to form a "double D" section 29 as shown in Fig. 3.

A screw shaft 31 is mounted on the second reduced extension 26, and has a portion 32 having a cylindrical bore conforming thereto, and abutting against the shoulder 27, and a portion 33 having a "double D" bore formed therein conforming to the "double D" section 29 of the shaft, whereby the screw shaft is non-rotatably connected to the power shaft. The screw shaft is locked on the power shaft by means of a thrust ring 34 which is retained by a split lock ring 35 seated in a groove 36 in the end of the power shaft.

The outer surface of the screw shaft 31 is formed flush with the surface of the first reduced extension 23 of the power shaft, and a pinion member 37 is slidably journalled on the screw shaft and said extension 33 for movement into engagement with an engine gear 38, its fully meshed position being defined by abutment with the thrust ring 25.

A nut member 39 is mounted on the screw shaft 31 and is provided with a radial flange 41. A barrel member 42 is keyed to the flange 41 of the nut member by means of lugs 43 extending into slots 44 in the barrel and retained therein by a split lock ring 45. The closed end of the barrel is provided with a radial flange 46 which is fixed in any suitable manner to the pinion member 37 as indicated at 47. A block 48 of elastic material such as rubber is mounted on the nut member 39, between the flange 41 of the nut member and flange 46 of the barrel in order to yieldingly transmit longitudinal movement from the nut member to the pinion.

Means are provided for normally maintaining the nut member and its associated parts in idle position in the form of a detent 49 mounted in the nut member 39 and arranged to bear frictionally on the screw shaft 31 by pressure of the rubber block 48. A thimble 51 is preferably mounted on the nut member 39 to prevent the rubber block from squeezing down into the space between the end of the nut member and the pinion. In the operation of this embodiment of the invention, rotation of the power shaft 21 is transmitted through the "double D" section 29 thereof to the screw shaft 31, whereby the nut member 39 is threaded along the screw shaft, causing the pinion 37 to move into mesh with the engine gear 38 after which rotation is transmitted to the engine, the drive being cushioned by the compression of the rubber block 48. When the engine starts, the parts are returned to idle position, and rebounding or drifting of the parts toward the engine member is prevented by the frictional engagement of the detent 49 with the screw shaft 31.

Figure 4:
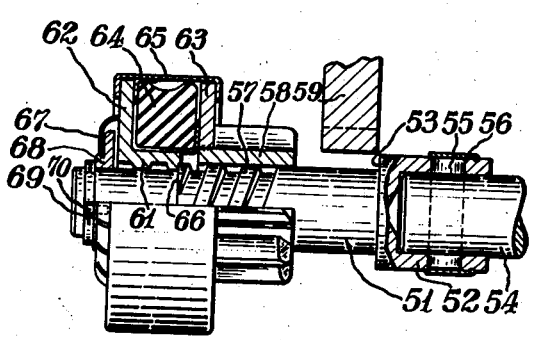
Fig. 4 is a view similar to Fig. 1 of a third embodiment of the invention.

In Fig. 4 of the drawing there is illustrated a form of the invention in which the drive is formed as a unit for attachment to the end of a plain cylindrical armature shaft of a starting motor. As here shown, a stub shaft 51 is provided with an enlarged socket 52 forming a thrust shoulder 53 and arranged to receive the end of a power shaft 54. Means such as a cross pin 55 retained by a thimble 56 is provided for locking the two shafts in coupled relation. The stub shaft 51 is threaded for a portion of its length as indicated at 57 and has slidably journalled thereon a pinion member 58 which is adapted to mesh with an engine gear 59.

A nut member 61 is mounted on the stub shaft 51 and is provided with a radial flange 62. A flange 63 is rigidly mounted on the pinion member 58 in any suitable manner, and an annular block 64 of elastically deformable material such as rubber is mounted on the nut member 61 and is maintained in light frictional engagement with the flanges 62 and 63 by means of a sleeve 65 having its ends crimped over said flanges.

The threads 57 of stub shaft 51 terminate adjacent the idle position of the nut member 61 as indicated at 66 whereby the nut may run off the ends of the threads and overrun the power shaft. Means for insuring re-entry of the nut in the threads 57 is provided in the form of a split spring washer 67 mounted on a ring 68 which is retained on the end of the stub shaft by means of a split lock ring 69. The ring 68 and spring washer 67 are preferably non-rotatably connected to the stub shaft in any suitable manner as by means of a pin 70 seated in the ring 68 and projecting between the ends of the split lock ring 69. The spring washer by its frictional engagement with the flange 62 thereby prevents the nut member from drifting away from its idle position.

The operation of this form of the invention is substantially the same as set forth in connection with the structure illustrated in Fig. 1. In operation, rotation of the power shaft 54 is transmitted to the stub shaft 51 through the coupling 52, 55, whereupon the nut 61 is threaded along the screw shaft 57 until the pinion engages the stop shoulder 53 whereupon rotation is transmitted to the pinion yieldably by means of the rubber ring 64. When the engine starts, the parts are returned to idle position by the overrunning of the nut member 61, and the nut member with its associated parts overrun the screw shaft until their momentum is dissipated. The parts are thereafter maintained in idle position by the frictional engagement of the spring washer 67 until the power shaft is again actuated.

Although certain embodiments of the invention have been shown and described in detail, it will be understood that other embodiments are possible and that changes may be made in the design and arrangement of the parts without departing from the spirit of the invention as defined in the claims appended hereto.

What is claimed is:

1. In an engine starter drive a power shaft having a smooth reduced portion forming a thrust shoulder, a further reduced smooth portion providing a second shoulder, and a terminal portion with driving flats formed thereon, a shaft exteriorly threaded throughout its length counter-bored at one end to bear on the further reduced portion of the power shaft and broached at the other end to fit the flatted section thereof, thrust means holding the threaded shaft on the power shaft with the top of its threads flush with the surface of the first reduced portion of the power shaft, a flanged pinion journalled on the threaded shaft and the first reduced portion of the power shaft, a flanged nut on the threaded shaft, a block of elastically deformable material seated on the nut between the flanges, said thrust means serving also as an abutment to define the idle position of the nut on the threaded shaft.

2. An engine starter drive as set forth in claim 1 including further an anti-drift detent mounted in the nut, pressed into frictional engagement with the threaded shaft by said block of elastically deformable material.

BURR W. JONES.